US010191273B2

(12) United States Patent
Kano

(10) Patent No.: US 10,191,273 B2
(45) Date of Patent: Jan. 29, 2019

(54) MIRROR DRIVING DEVICE, BEAM IRRADIATION DEVICE, AND LASER RADAR

(71) Applicant: Panasonic Intellectual Property Management Co., Ltd., Osaka (JP)

(72) Inventor: Yasuyuki Kano, Kunamoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 384 days.

(21) Appl. No.: 15/229,114

(22) Filed: Aug. 5, 2016

(65) Prior Publication Data

US 2016/0341957 A1 Nov. 24, 2016

Related U.S. Application Data

(63) Continuation of application No. PCT/JP2014/005698, filed on Nov. 13, 2014.

(30) Foreign Application Priority Data

Apr. 11, 2014 (JP) ................................ 2014-082205

(51) Int. Cl.
*G01C 3/08* (2006.01)
*G02B 26/10* (2006.01)
(Continued)

(52) U.S. Cl.
CPC .......... *G02B 26/101* (2013.01); *G01S 7/4817* (2013.01); *G01S 17/06* (2013.01);
(Continued)

(58) Field of Classification Search
CPC ..... G02B 26/105; G02B 26/101; G01S 17/42; G01S 17/10; G01S 17/06; G01S 7/4817
(Continued)

(56) References Cited

U.S. PATENT DOCUMENTS 8,054,520 B2 * 11/2011 Noh ........................ G01S 17/42 359/200.1
8,130,432 B2 * 3/2012 Lee ...................... G02B 26/101 359/200.1
2005/0168720 A1 8/2005 Yamashita et al.

FOREIGN PATENT DOCUMENTS

JP 2005-221336 8/2005
JP 2011-095474 5/2011
(Continued)

OTHER PUBLICATIONS

International Search Report of PCT application No. PCT/JP2014/005698 dated Dec. 9, 2014.

*Primary Examiner* — Mark Hellner
(74) *Attorney, Agent, or Firm* — McDermott Will & Emery LLP

(57) ABSTRACT

A mirror driving device includes a rotating shaft, a first driving source, a mirror holder, a mirror, a rotating body, a guide, a moving mechanism, and a second driving source. The first driving source rotates the rotating shaft. The mirror holder is supported on the rotating shaft by a support shaft extending perpendicular to the rotating shaft and is rotatable about the support shaft. A holding part is provided at an edge of the mirror holder. The mirror holder is placed on the rotating body at a position located away from the support shaft. The guide is disposed at the holding part, and guides the holding part so as to be capable of changing a distance between the holding part and the rotating shaft. The moving mechanism moves the rotating body in a direction parallel to the rotating shaft in a state where the rotating body is rotatable with the rotating shaft. The second driving source moves the rotating body via the moving mechanism.

9 Claims, 16 Drawing Sheets

(51) Int. Cl.
*G01S 17/42* (2006.01)
*G01S 7/481* (2006.01)
*G01S 17/06* (2006.01)
*G01S 17/10* (2006.01)

(52) U.S. Cl.
CPC .............. *G01S 17/10* (2013.01); *G01S 17/42* (2013.01); *G02B 26/105* (2013.01)

(58) Field of Classification Search
USPC ........................................................ 356/4.01
See application file for complete search history.

(56) References Cited

FOREIGN PATENT DOCUMENTS

| | | |
|---|---|---|
| JP | 2011-169730 | 9/2011 |
| JP | 2013-130531 | 7/2013 |

* cited by examiner

MIRROR DRIVING DEVICE, BEAM IRRADIATION DEVICE, AND LASER RADAR

RELATED APPLICATIONS

This application is a Continuation of International Application No. PCT/JP2014/005698, filed on Nov. 13, 2014, which in turn claims priority from Japanese Patent Application No. 2014-082205, filed on Apr. 11, 2014, the contents of all of which are incorporated herein by reference in their entireties.

BACKGROUND

1. Technical Field

The present disclosure relates to a mirror driving device for scanning a target area with a laser beam, a beam irradiation device having the mirror driving device, and a laser radar for detecting a state of the target area, based on a laser beam reflected from the target area.

2. Description of the Related Art

In recent years, laser radars are used for providing security, such as detection of intrusion into buildings. Typically, a laser radar scans a target area with a laser beam and detects a presence of an object at a scan position when the laser radar receives reflected light from the object. With the laser radar, a distance between the object and the laser radar at the scan position is determined based on a time between emission and reception of the laser beam by the laser radar at the scan position.

A known actuator for scanning a laser beam includes, for example, a rotating body rotated by a motor, with a mirror mounted to the rotating body at an angle (see, for example, Unexamined Japanese Patent Publication No. 2011-169730). In this actuator, the rotating body is provided with both a mechanism for changing a degree of tilt of the mirror and a driving unit for driving the mechanism.

SUMMARY

A first aspect of the present disclosure relates to a mirror driving device. The mirror driving device according to the first aspect includes a rotating shaft, a first driving source, a mirror holder, a mirror, a rotating body, a guide, a moving mechanism, and a second driving source. The first driving source rotates the rotating shaft. The mirror holder is supported on the rotating shaft by a support shaft extending perpendicular to the rotating shaft and is rotatable about the support shaft. The mirror is mounted to the mirror holder. A holding part is provided at an edge of the mirror holder. The mirror holder is placed on the rotating body at a position located away from the support shaft. The guide is disposed at the holding part, and guides the holding part so as to be capable of changing a distance between the holding part and the rotating shaft. The moving mechanism moves the rotating body in a direction parallel to the rotating shaft in a state where the rotating body is rotatable with the rotating shaft. The second driving source moves the rotating body via the moving mechanism.

A second aspect of the present disclosure relates to a beam irradiation device. The beam irradiation device according to the second aspect includes the mirror driving device according to the first aspect, a light source which emits a laser beam, and a light-emitting optical system which causes a laser beam emitted by the light source to enter the mirror.

A third aspect of the present disclosure relates to a laser radar. The laser radar according to the third aspect includes the beam irradiation device according to the second aspect and a light-receiving optical system which guides, to a light detector, a laser beam that has been reflected from a target area and has entered a mirror. The light-receiving optical system includes a space through which a laser beam that has been emitted by the light source and has traveled to the mirror passes, and a reflector having a reflecting surface for reflecting a laser beam that has been reflected from a target area and has entered the mirror.

The present disclosure provides a mirror driving device capable of scanning a wide area with a laser beam, a beam irradiation device having the mirror driving device, and a laser radar.

Effects and significance of the present disclosure will become more apparent from the following description of an exemplary embodiment. It should be noted that the exemplary embodiment described below is merely exemplary in nature in carrying out the present disclosure, and that the present disclosure is not intended to be limited in any way to the following exemplary embodiment.

BRIEF DESCRIPTION OF THE DRAWINGS

FIGS. 4A and 4B illustrate a structure of an inner unit of the mirror actuator according to the exemplary embodiment, while

DETAILED DESCRIPTION OF EMBODIMENTS

Before the exemplary embodiment of the present disclosure is described, a disadvantage found in a conventional art is briefly described. In the conventional art, a driving source is provided to a rotating body. With this configuration, a signal wire for supplying electric power to the driving source is extended from a base to the rotating body. In this case, the signal wire would be caught on other components or the like and break if the rotating body is rotated to have a large angle of rotation. For this reason, a laser beam cannot be scanned over a wide area in the conventional art.

In view of the foregoing disadvantage, the present disclosure provides a mirror driving device capable of scanning a wide area with a laser beam, a beam irradiation device having the mirror driving device, and a laser radar.

The exemplary embodiment of the present disclosure is described below with reference to the accompanying drawings.

Figure 1:
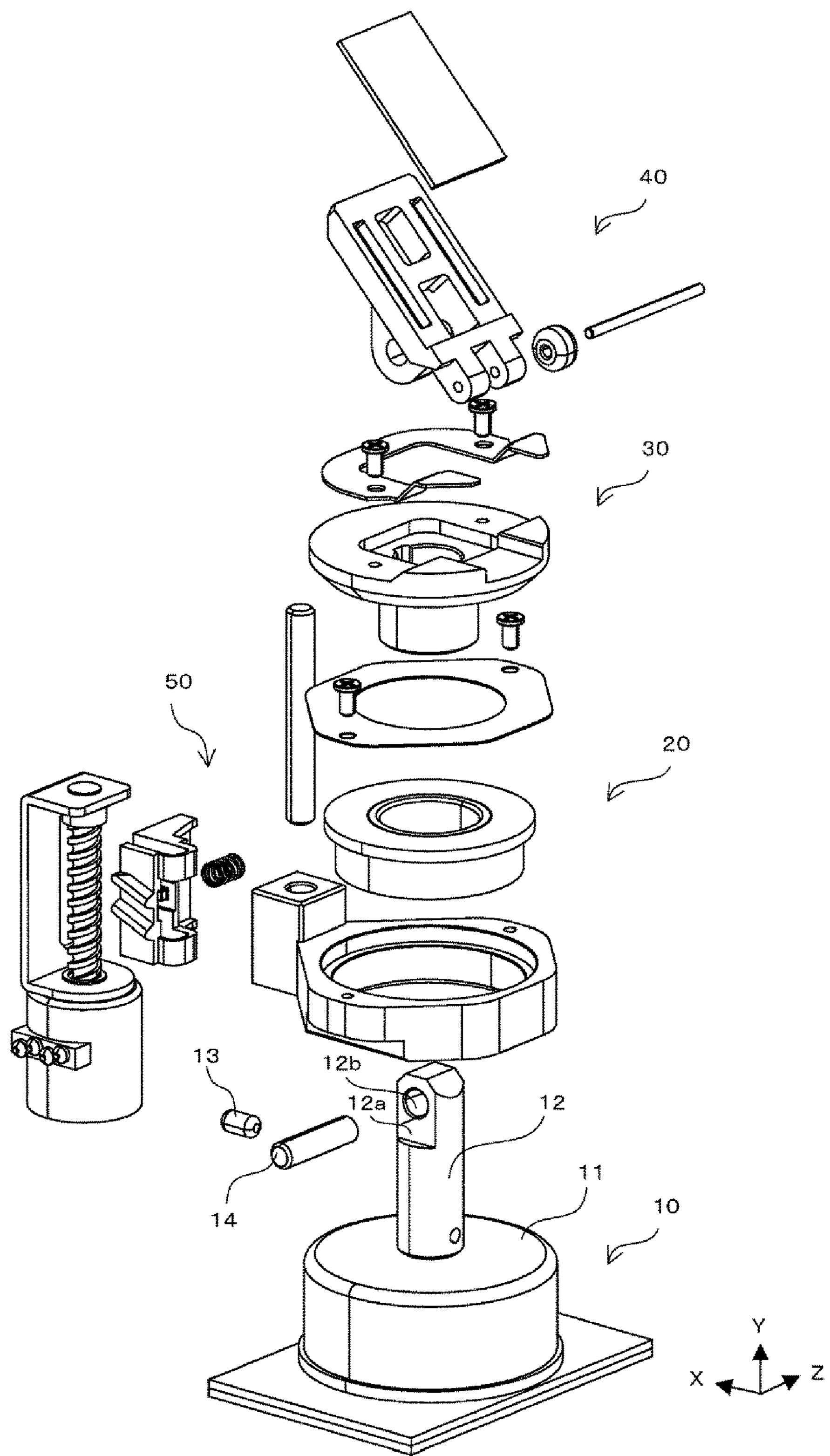
FIG. 1 is an exploded perspective view of a mirror actuator according to an exemplary embodiment.

FIG. 1 is an exploded perspective view of mirror actuator (mirror driving device) 1. As illustrated in FIG. 1, mirror actuator 1 includes panning driving unit 10, outer unit (moving mechanism) 20, inner unit 30, mirror unit 40, and tilting driving unit (moving mechanism) 50.

Figure 2A:
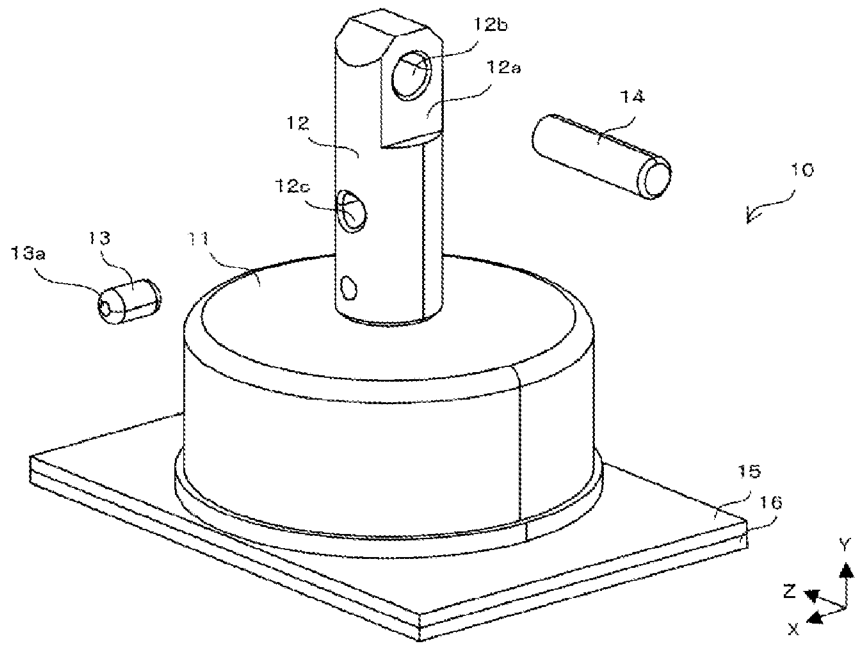
FIGS. 2A and 2B illustrate a structure of a panning driving unit of the mirror actuator according to the exemplary embodiment.
Figure 2B:
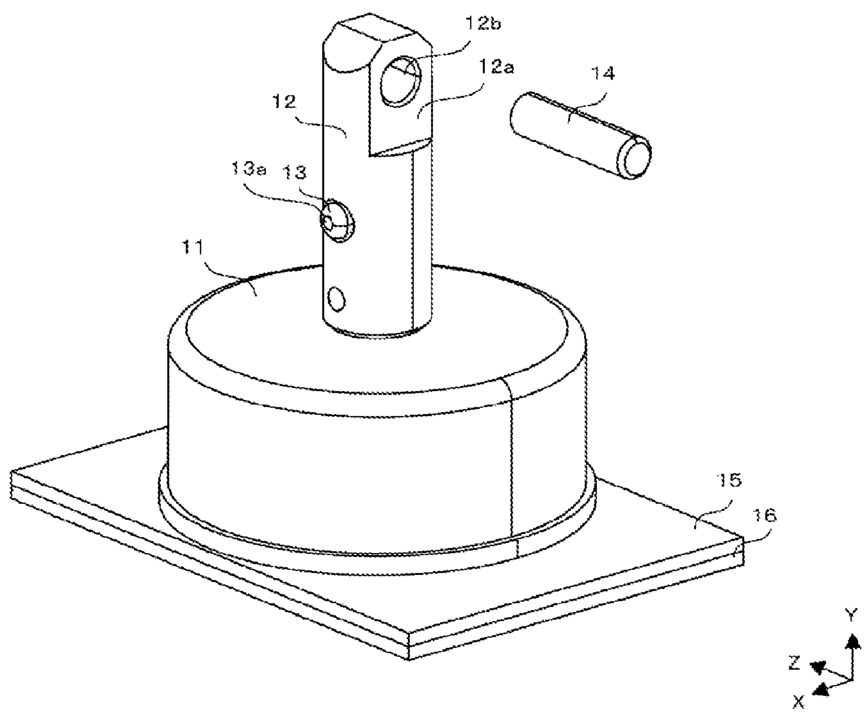

FIGS. 2A and 2B are perspective views of a structure of panning driving unit 10 included in mirror actuator 1.

Referring to FIG. 2A, panning driving unit 10 includes motor (first driving source) 11, rotating shaft 12, pin 13, support shaft 14, motor circuit board 15, and motor frame 16.

Motor 11, which is electrically connected to motor circuit board 15, rotates rotating shaft 12 in response to an electrical signal from a circuit. Motor 11 and motor circuit board 15 are supported on motor frame 16. Motor 11 is, for example, a brushless DC motor. Rotating shaft 12 is cylindrical. Step portion 12*a* is formed at an upper portion of rotating shaft 12 at negative Z-axis and positive Z-axis sides. Step portion 12*a* includes shaft hole 12*b* formed through rotating shaft 12 in the Z-axis direction. Shaft hole 12*b* is slightly smaller in diameter than support shaft 14. Support shaft 14 is passed through shaft hole 12*b* when mirror unit 40 (see FIG. 1) described later is pivotally mounted to rotating shaft 12. Rotating shaft 12 includes pinhole 12*c* formed at a positive X-axis side for insertion of pin 13. Pinhole 12*c* is slightly smaller in diameter than pin 13, and has a depth (i.e., a length in the X-axis direction) which is slightly less than a length of pin 13 in the X-axis direction. As illustrated in FIG. 2B, pin 13 is inserted into pinhole 12*c*. In this state, end 13*a* of pin 13 is positioned forwardly of rotating shaft 12 at the positive X-axis side.

Figure 3A:
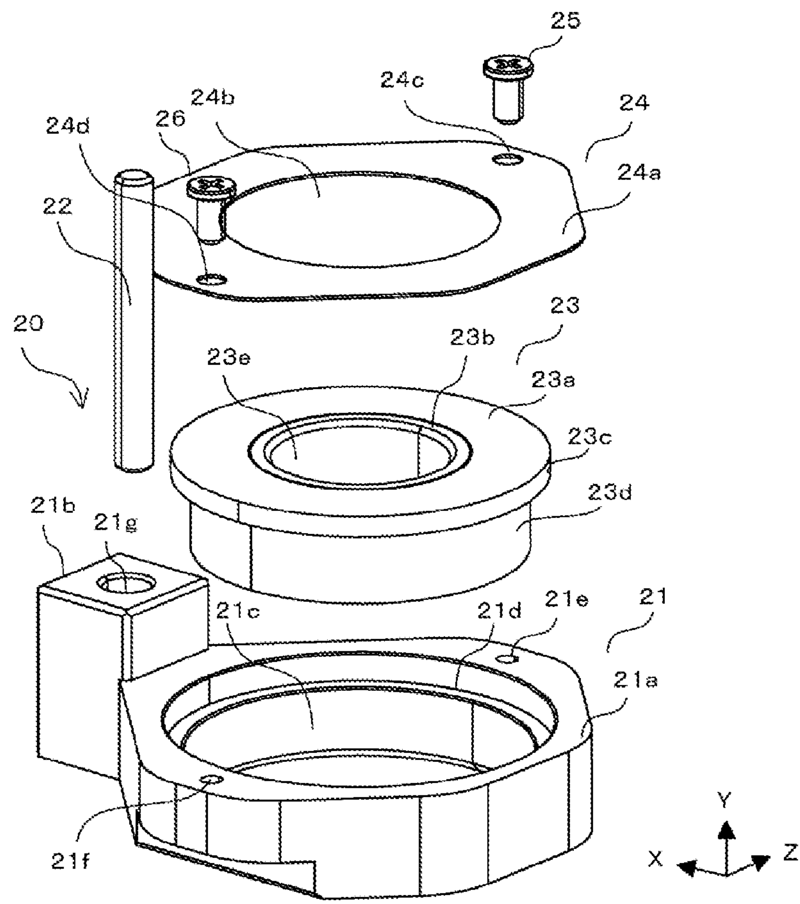
FIGS. 3A and 3B illustrate a structure of an outer unit of the mirror actuator according to the exemplary embodiment.
Figure 3B:
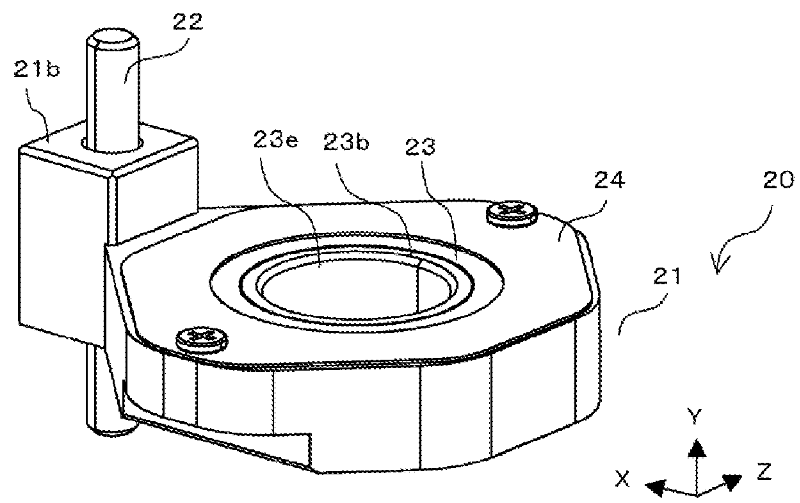

FIG. 3A is an exploded perspective view of a structure of outer unit 20 included in mirror actuator 1. FIG. 3B is a perspective view of a structure of outer unit 20.

Referring to FIG. 3A, outer unit 20 includes outer frame (moving body) 21, guide shaft 22, bearing 23, and bearing plate 24.

Outer frame 21 includes holding part 21*a* and guide 21*b*. Holding part 21*a* pivotally holds inner unit 30 (see FIG. 1) and mirror unit 40 (see FIG. 1). Guide 21*b* guides inner unit 30 (see FIG. 1) and mirror unit 40 (see FIG. 1) in a vertical direction. Holding part 21*a* includes circular opening 21*c* formed through holding part 21*a* in a Y-axis direction. Step portion 21*d* is formed in an inner side surface of opening 21*c* at a predetermined upper portion in the Y-axis direction. Step portion 21*d* makes a diameter of opening 21*c* larger at a positive Y-axis side than at a negative Y-axis side. Holding part 21*a* further includes screw holes 21*e*, 21*f*. Guide 21*b* has a substantially rectangular parallelepiped shape and is larger in width in the Y-axis direction than holding part 21*a*. Guide 21*b* includes circular guide hole 21*g* formed through guide 21*b* in the Y-axis direction. Guide hole 21*g* is slightly larger in diameter than guide shaft 22. Guide shaft 22 is cylindrical.

Bearing 23 includes outside frame 23*a* and inside frame 23*b*. Bearing 23 is a ball bearing that includes multiple balls between outside frame 23*a* and inside frame 23*b*. In bearing 23, inside frame 23*b* is rotatable relative to outside frame 23*a* about a shaft parallel to the Y-axis direction. Outside frame 23*a* includes large-diameter portion 23*c* and small-diameter portion 23*d*. Large-diameter portion 23*c* is slightly smaller in diameter than opening 21*c* of outer frame 21 at the positive Y-axis side and is larger than opening 21*c* at the negative Y-axis side. Small-diameter portion 23*d* is slightly smaller in diameter than opening 21*c* of outer frame 21 at the negative Y-axis side. Inside frame 23*b* is cylindrical and includes circular opening 23*e*.

Bearing plate 24 includes plate 24*a* shaped to conform to a contour of holding part 21*a* of outer frame 21 in a plan view. In a center of plate 24*a*, circular opening 24*b* is formed. Plate 24*a* includes screw apertures 24*c*, 24*d*.

During assembly of outer unit 20, bearing 23 is first inserted into opening 21*c* of outer frame 21. At this time, outside frame 23*a* is pushed into opening 21*c* of outer frame 21 until a surface on the negative Y-axis side of large-diameter portion 23*c* of outside frame 23*a* contacts step portion 21*d* of outer frame 21. Then, screw apertures 24*c*, 24*d* of bearing plate 24 are respectively aligned with screw holes 21*e*, 21*f* of outer frame 21. In this state, screws 25, 26 are screwed into screw holes 21*e*, 21*f* through screw apertures 24*c*, 24*d*, respectively, thus causing bearing plate 24 to be fixed to outer frame 21. Guide shaft 22 is then passed through guide hole 21*g*. Thus, outer unit 20 has been assembled as illustrated in FIG. 3B.

In the state of outer unit 20 illustrated in FIG. 3B, large-diameter portion 23*c* of outside frame 23*a* is sandwiched between an undersurface of bearing plate 24 and step portion 21*d* of outer frame 21. Consequently, the undersurface of bearing plate 24 and step portion 21*d* of outer frame 21 prevent bearing 23 from moving in the vertical direction.

Figure 4A:
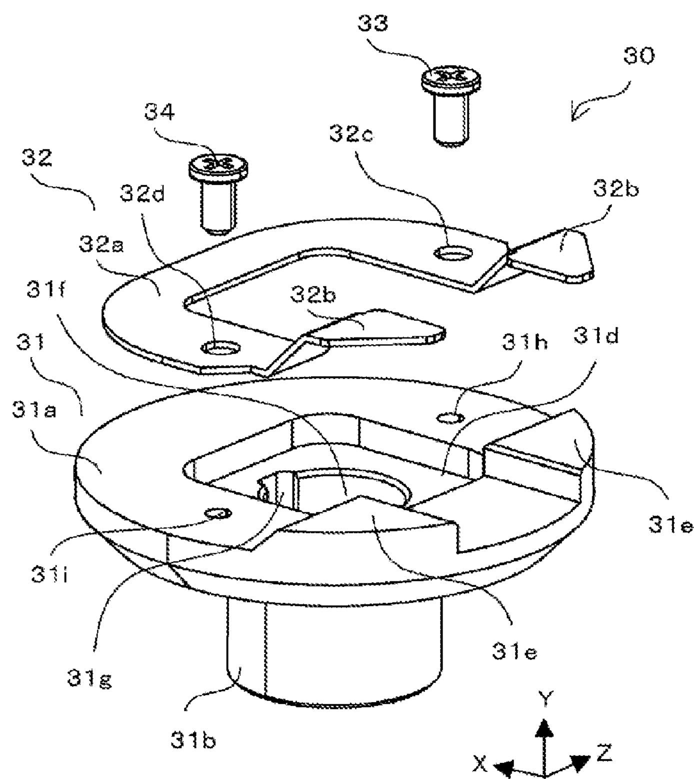
Figure 4B:
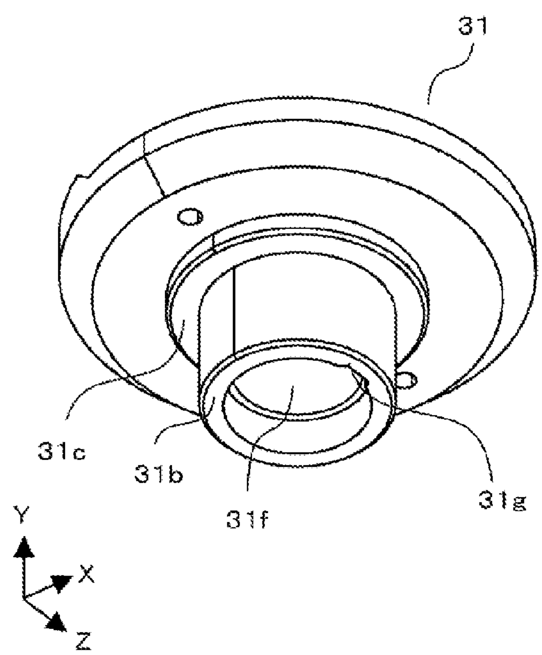
Figure 4C:
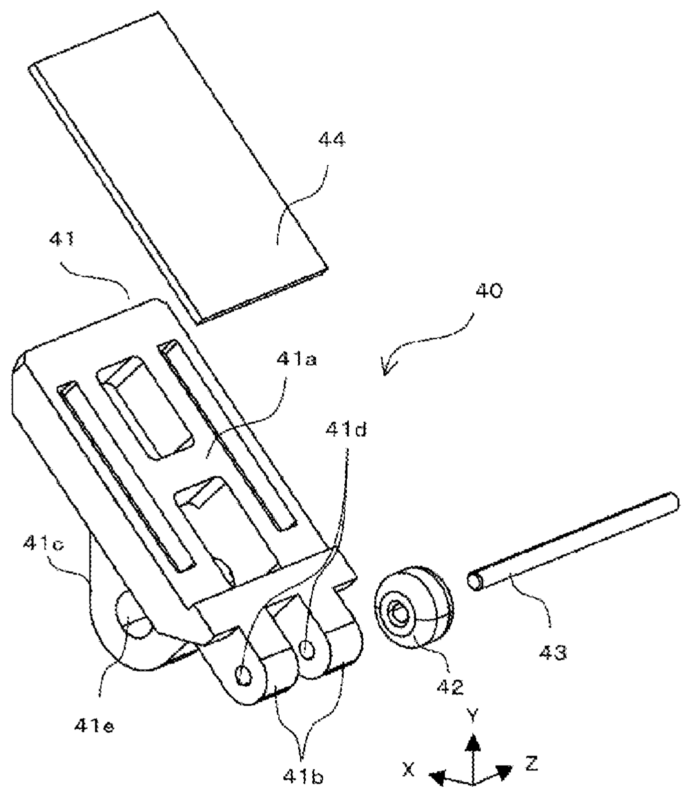
FIGS. 4C and 4D illustrate a structure of a mirror unit of the mirror actuator according to the exemplary embodiment.
Figure 4D:
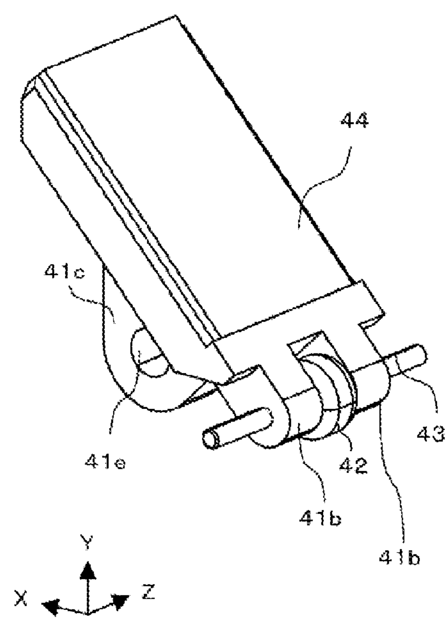

FIG. 4A is an exploded perspective view of a structure of inner unit 30 included in mirror actuator 1. FIG. 4B is a perspective view of inner frame (rotating body) 31 when viewed from below. FIG. 4C is an exploded perspective view of a structure of mirror unit 40 included in mirror actuator 1. FIG. 4D is a perspective view of a structure of mirror unit 40.

Referring to FIG. 4A, inner unit 30 includes inner frame 31 and presser bar spring 32.

Inner frame 31 includes top surface portion 31*a* and cylindrical portion 31*b*. As illustrated in FIG. 4B, cylindrical portion 31*b* includes flange 31*c* formed at the positive Y-axis side. Referring back to FIG. 4A, top surface portion 31*a* includes step portion 31*d* in a center of top surface portion 31*a* and two projections 31*e* at top surface portion 31*a* at a negative X-axis side. Step portion 31*d* is formed to be one level lower than a surrounding area, while two projections 31*e* are formed to be one level higher than the surrounding area. Top surfaces of projections 31*e* are flat. Step portion 31*d* includes circular opening 31*f* formed through inner frame 31 in the Y-axis direction. Opening 31*f* includes rectangular recess 31*g* formed at the positive X-axis side to extend in the Y-axis direction. Opening 31*f* is slightly larger in diameter than rotating shaft 12 (see FIG. 2B) of motor 11. Cylindrical portion 31*b* has an outer diameter slightly larger than a diameter of opening 23*e* (see FIG. 3A) of inside frame 23*b* included in outer unit 20. Flange 31*c* has a diameter which is slightly larger than an outer diameter of inside frame 23*b* and which is smaller than a diameter of opening 24*b* of bearing plate 24. Top surface portion 31*a* includes screw holes 31*h*, 31*i*.

Presser bar spring 32 is formed of an elastic material. Presser bar spring 32 has a substantially U-shape when viewed from above. Presser bar spring 32 includes flat surface portion 32*a* and two hooks 32*b*. Flat surface portion 32*a* includes screw apertures 32*c*, 32*d*.

Referring to FIG. 4C, mirror unit 40 includes mirror holder 41, roller 42, support shaft 43, and mirror 44.

Mirror holder 41 includes mirror mounting part 41*a* for holding mirror 44 at an angle, roller holding part (holding part) 41*b* for holding roller (guide) 42, and rotating shaft holding parts 41*c* for holding rotating shaft 12 (see FIG. 2B). A lower end of mirror mounting part 41*a* is stepped. Two roller holding parts 41*b* each include a projection with a round end. The two projections each include shaft hole 41*d* formed through the projections in the Z-axis direction. A distance between the two projections of roller holding parts 41*b* is slightly greater than a thickness of roller 42 in the Z-axis direction. Two rotating shaft holding parts 41*c* each include a projection with a round end. The two projections each include shaft hole 41*e* formed through the projections in the Z-axis direction. The two projections of rotating shaft holding parts 41*c* incline at a predetermined angle to a surface of mirror mounting part 41*a* where mirror 44 is fitted.

During assembly of mirror unit 40, mirror 44 is first adhesively secured to mirror mounting part 41*a*. Then, roller 42 is inserted between the two projections of roller holding parts 41*b*, and support shaft 43 is passed through two shaft holes 41*d* and roller 42. Thus, mirror unit 40 has been assembled as illustrated in FIG. 4D.

Figure 5A:
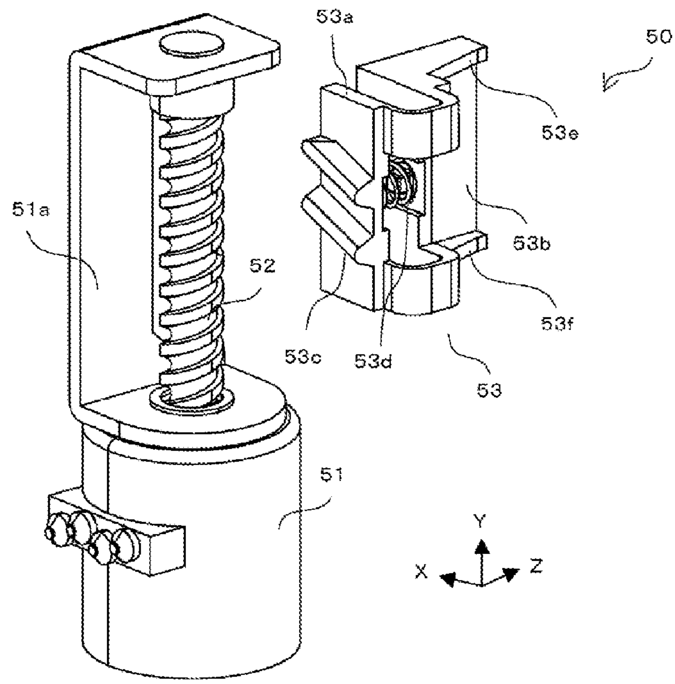
FIGS. 5A and 5B illustrate a structure of a tilting driving unit of the mirror actuator according to the exemplary embodiment.
Figure 5B:
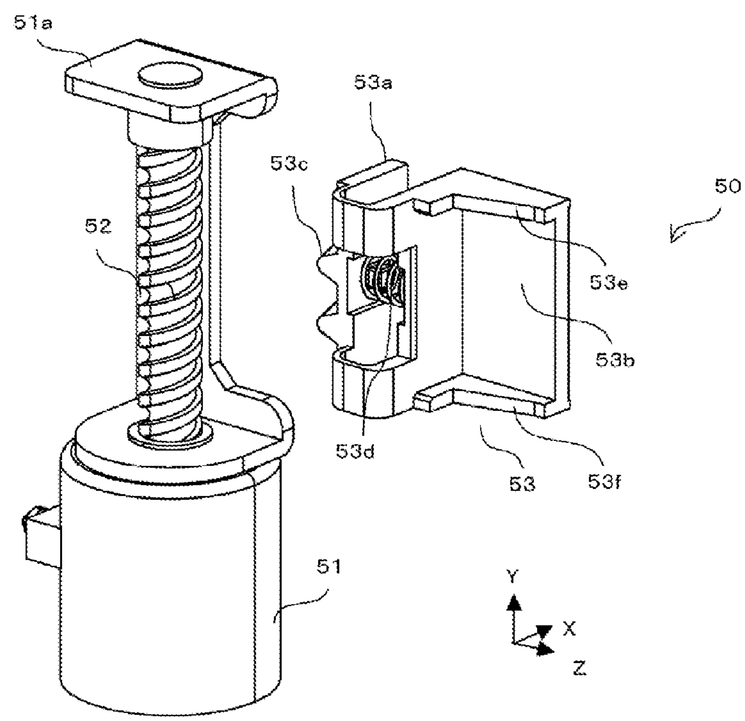

FIGS. 5A and 5B are perspective views of a structure of tilting driving unit 50.

Referring to FIGS. 5A and 5B, tilting driving unit 50 includes motor 51 (second driving source), lead screw 52, and gear rack 53.

Motor 51 is a stepping motor. Chassis 51*a* is mounted on motor 51. One end of lead screw 52 is mounted to rotating shaft of motor 51, while the other end of lead screw 52 is mounted to one end of chassis 51*a* via a bearing. Gear rack 53 includes hook 53*a* and guide holding part 53*b*. Gear teeth 53*c* are formed at a surface of hook 53*a* at the negative Z-axis side. Spring 53*d* is provided between hook 53*a* and guide holding part 53*b*. Gear rack 53 is formed from a flexible material which enables gear rack 53 to be deformed slightly in the Z-axis direction. Guide holding part 53*b* includes wall portions 53*e*, 53*f*. A distance between wall portions 53*e*, 53*f* is slightly greater than a width of guide 21*b* (illustrated in FIG. 3A) in the Y-axis direction.

During assembly of mirror actuator 1, cylindrical portion 31*b* of inner frame 31 (illustrated in FIG. 4B) is first press-fitted into opening 23*e* of outer unit 20 (illustrated in FIG. 3B). Then, rotating shaft 12 (illustrated in FIG. 2B) is passed through outer unit 20 and inner unit 30, with pin 13 (illustrated in FIG. 2B) fitted into recess 31*g* of cylindrical portion 31*b* included in inner frame 31 (illustrated in FIG. 4A). Thus, a construct has been assembled as illustrated in FIG. 6A.

Figure 6A:
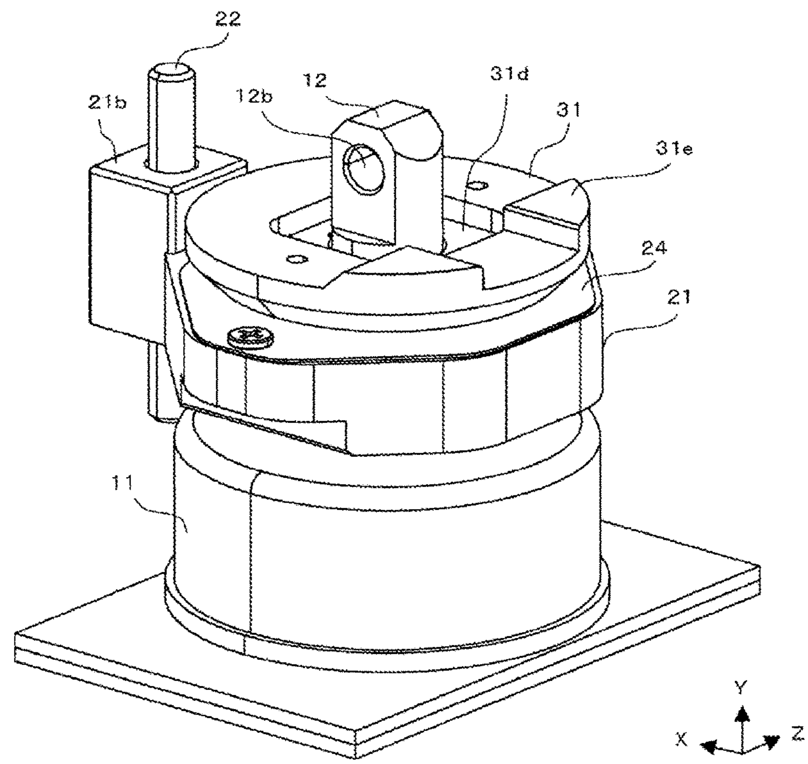
FIGS. 6A and 6B illustrate an assembly process for the mirror actuator according to the exemplary embodiment.
Figure 6B:
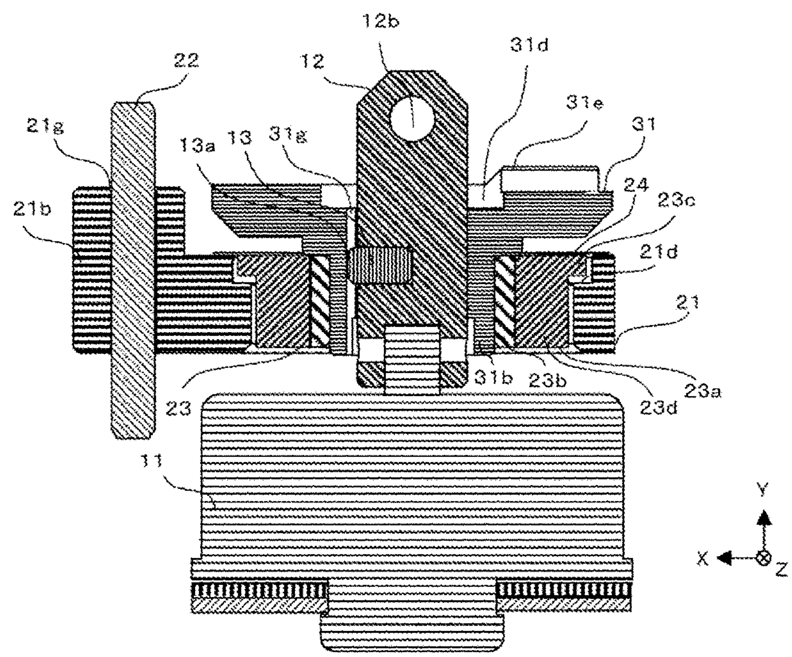

FIG. 6A is a perspective view of the construct, with outer unit 20 and inner frame 31 mounted to motor 11. FIG. 6B is a cross-sectional view which is taken through a center of the construct at the Z-axis direction and which is taken along a plane parallel to an X-Y plane.

As illustrated in FIG. 6B, in the state of the construct, end 13*a* of pin 13 is fitted into recess 31*g* of inner frame 31. This structure enables inner frame 31 to be rotated with rotating shaft 12, and pin 13 to be guided by recess 31*g*, which in turn enables outer frame 21 and inner frame 31 to be moved in the Y-axis direction.

Then, rotating shaft 12 of the construct (illustrated in FIG. 6A) is inserted between the two projections of rotating shaft holding parts 41*c* included in mirror unit 40 (illustrated in FIG. 4D), and shaft hole 12*b* of rotating shaft 12 is aligned with two shaft holes 41*e* of rotating shaft holding parts 41*c*. In this state, support shaft 14 (illustrated in FIG. 2B) is passed through two shaft holes 41*e* of rotating shaft holding parts 41*c* and shaft hole 12*b* of rotating shaft 12. Thus, a construct has been assembled as illustrated in FIG. 7A.

Figure 7A:
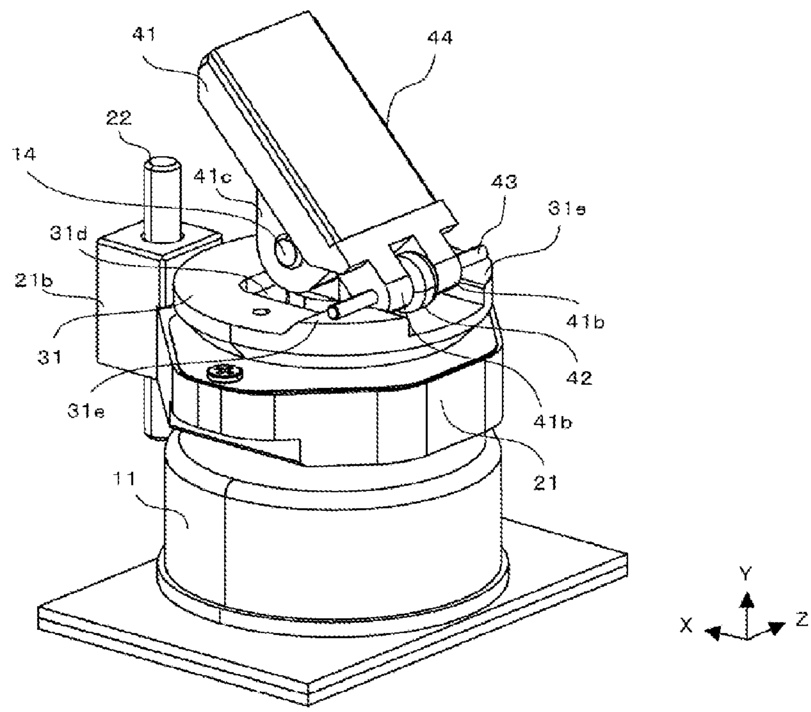
FIGS. 7A and 7B illustrate the assembly process for the mirror actuator according to the exemplary embodiment.
Figure 7B:
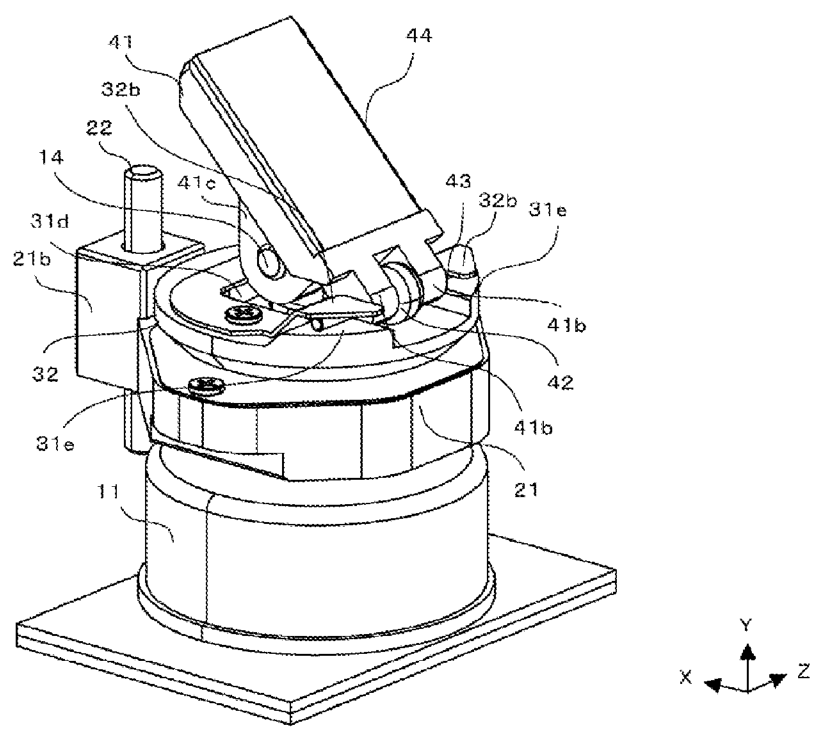

FIGS. 7A and 7B are perspective views of a construct obtained by mounting mirror unit 40 on the construct in which outer unit 20 and inner frame 31 are mounted to motor 11.

In the state of the construct illustrated in FIG. 7A, roller 42 is positioned between two projections 31*e* of inner frame 31, and support shaft 43 is positioned above two projections 31*e* of inner frame 31. Additionally, a predetermined space is provided between a lower end of rotating shaft holding parts 41*c* and step portion 31*d* of inner frame 31. In this state, mirror holder 41 is supported by support shaft 14 and roller 42. Consequently, roller 42 is moveable in a forward and backward direction (in the X-axis direction).

As illustrated in FIG. 7B, presser bar spring 32 is mounted to inner frame 31 of the construct in the state, with support shaft 43 sandwiched between two hooks 32*b* of presser bar spring 32 and projections 31*e* of inner frame 31. Then, screws 33, 34 (see FIG. 4A) are screwed into screw holes 31*h*, 31*i* (see FIG. 4A) through screw apertures 32*c*, 32*d* (see FIG. 4A). Thus, a construct has been assembled as illustrated in FIG. 7B. In the state of the construct illustrated in FIG. 7B, support shaft 43 is held down (in a negative Y-axis direction) by hooks 32*b* of presser bar spring 32, preventing roller 42 from rising in the Y-axis direction. During the assembly of the construct illustrated in FIG. 7B, a tilt angle of mirror 44 is adjusted so that a laser beam emitted by light source 110 described later is reflected in a negative X-axis direction.

Figure 8:
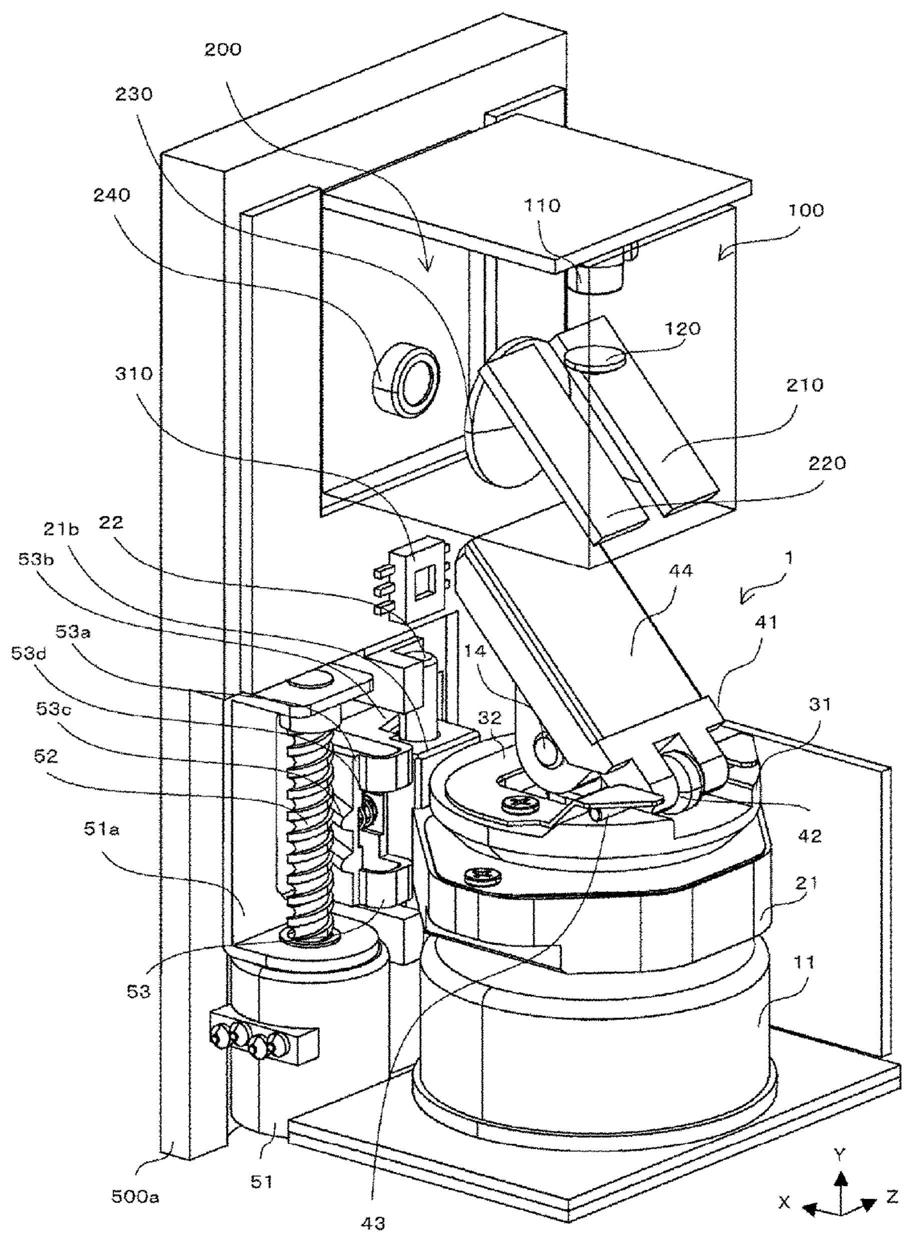
FIG. 8 illustrates a structure of a laser radar according to the exemplary embodiment.

FIG. 8 is a schematic view of a structure of laser radar 500 having mirror actuator 1. FIG. 8 illustrates only main optical components. In FIG. 8, mounting structures for the optical components, a circuit board, or the like are not illustrated.

Guide 21*b* is fitted into and adhesively secured to guide holding part 53*b* of gear rack 53 (illustrated in FIG. 5B). Chassis 51*a* of motor 51 and guide shaft 22 are secured to base 500*a*. Gear teeth 53*c* of gear rack 53 are placed against lead screw 52, with hooks 53*a* of gear rack 53 slightly deformed to the positive Z-axis side. While being urged by spring 53*d*, gear teeth 53*c* mesh with lead screw 52. Thus, mirror actuator 1 has been assembled as illustrated in FIG. 8.

In the assembled state of mirror actuator 1 illustrated in FIG. 8, driving motor 11 causes rotating shaft 12 (see FIG. 2A) to rotate. The rotation of rotating shaft 12 causes mirror holder 41 to pivot because rotating shaft 12 is integrally connected to mirror holder 41 by support shaft 14. Additionally, as illustrated in FIG. 6B, the rotation of rotating shaft 12 causes inner frame 31 to rotate because end 13*a* of pin 13 is fitted into recess 31*g* of inner frame 31. Consequently, mirror 44 heled by mirror holder 41 is pivoted in a direction of panning.

In the assembled state of mirror actuator 1 illustrated in FIG. 8, driving motor 51 causes lead screw 52 to rotate. The rotating of lead screw 52 causes gear rack 53, which meshes with lead screw 52, to move in the vertical direction (Y-axis direction). This movement of gear rack 53 causes guide 21*b*, which is secured to gear rack 53, to move in the vertical direction (Y-axis direction) along guide shaft 22. Consequently, outer frame 21 is moved in the vertical direction (Y-axis direction).

Figure 9:
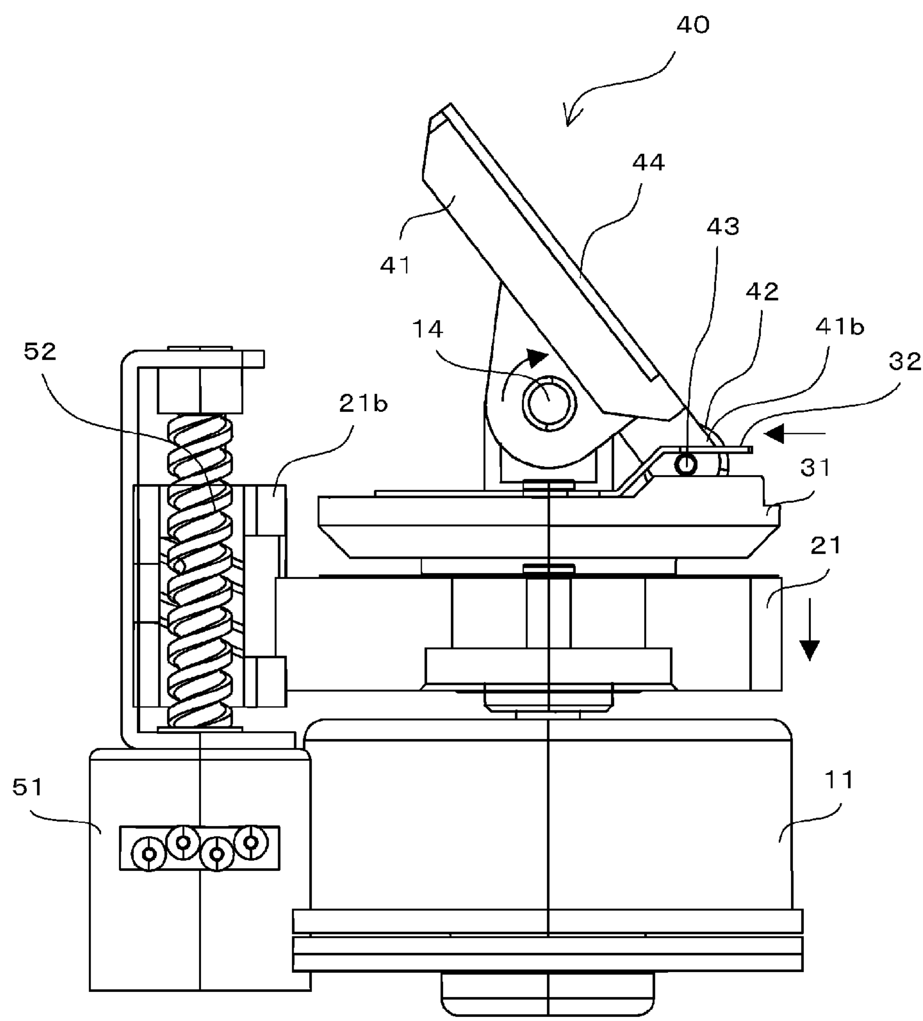
FIG. 9 illustrates a structure of the mirror actuator, with an outer frame according to the exemplary embodiment descended.
Figure 9:
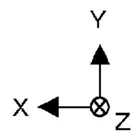
Figure 10:
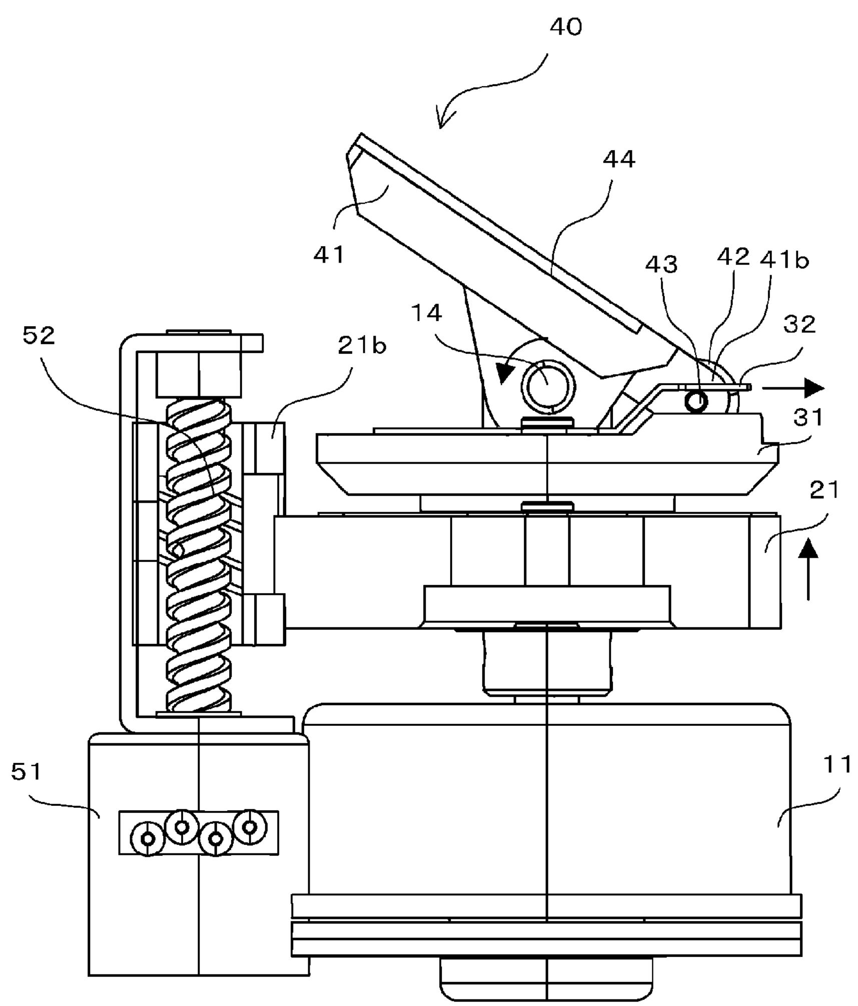
FIG. 10 illustrates a structure of the mirror actuator, with the outer frame according to the exemplary embodiment ascended.
Figure 10:
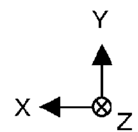

FIG. 9 is a side view of mirror actuator 1, with outer frame 21 moved in a downward direction. FIG. 10 is a side view of mirror actuator 1, with outer frame 21 moved in an upward direction.

Referring to FIG. 9, movement of outer frame 21 in the downward direction (negative Y-axis direction) causes bearing 23 (see FIG. 6B) to move in the downward direction (negative Y-axis direction). This movement of bearing 23 causes inner frame 31, which is fitted to inside frame 23*b* (see FIG. 6B) of bearing 23, to be pushed in the downward direction. At this time, as illustrated in FIG. 6B, end 13*a* of pin 13 included rotating shaft 12 is moved along recess 31*g* of inner frame 31, to be guided in the Y-axis direction. Additionally, guide 21*b* slides along guide shaft 22, to be guided in the Y-axis direction. Consequently, inner frame 31 and roller holding parts 41*b* of mirror holder 41 are descended, as illustrated in FIG. 9. At this time, a position of mirror holder 41, which is supported by support shaft 14, does not change in the Y-axis direction. Accordingly, mirror holder 41 is applied force to cause mirror holder 41 to pivot about support shaft 14 in a clockwise direction as viewed from the negative Z-axis side of mirror holder 41. The clockwise force causes mirror holder 41 to pivot about support shaft 14 in a clockwise direction as viewed from the negative Z-axis side of mirror holder 41. This rotation of mirror holder 41 causes roller holding parts 41*b* to move to the negative X-axis side with the help of roller 42 and support shaft 43. Consequently, the tilt angle of mirror 44 becomes small, as illustrated in FIG. 9.

Referring to FIG. 10, movement of outer frame 21 in the upward direction (positive Y-axis direction) causes bearing 23 (see FIG. 6B) to move in the upward direction (positive Y-axis direction). This movement of bearing 23 causes inner frame 31, which is fitted into inside frame 23*b* of bearing 23, to be pushed in the upward direction, as illustrated in FIG. 6B. At this time, end 13*a* of pin 13 included in rotating shaft 12 is moved along recess 31*g* of inner frame 31, to be guided in the Y-axis direction. Additionally, guide 21*b* slides along guide shaft 22, to be guided in the Y-axis direction. Consequently, inner frame 31 and roller holding parts 41*b* of mirror holder 41 are ascended, as illustrated in FIG. 10. At this time, the position of mirror holder 41, which is supported by support shaft 14, does not change in the Y-axis direction. Accordingly, mirror holder 41 is applied force to cause mirror holder 41 to pivot about support shaft 14 in a counter-clockwise direction as viewed from the negative Z-axis side of mirror holder 41. The counter-clockwise force causes mirror holder 41 to pivot about support shaft 14 in the counter-clockwise direction as viewed from the negative Z-axis side of mirror holder 41. This rotation of mirror holder 41 causes roller holding parts 41*b* to move to the positive X-axis side with the help of roller 42 and support shaft 43. Consequently, the tilt angle of mirror 44 becomes large, as illustrated in FIG. 9.

Projections 31*e* of inner frame 31 and hooks 32*b* of presser bar spring 32 have lengths in the X-axis direction so that support shaft 43 is positioned between presser bar spring 32 and inner frame 31 even when outer frame 21 is moved to its upper limit position.

In this way, mirror 44, which is heled by mirror holder 41, is pivoted in a direction of tilting. Support shaft 43 is held down (in the downward direction) by presser bar spring 32, preventing mirror 44 from rattling when pivoted in a direction of tilting.

Thus, in the exemplary embodiment, the rotation of motor 11, which causes mirror 44 to pivot in a direction of panning, does not affect the rotation of motor 51, which causes mirror 44 to pivot in a direction of tilting, and vice versa. This allows motor 11 and motor 51 to be independently controlled. Additionally, motor 51 is disposed to a base, eliminating a signal wire extended to inner frame 31 serving as a rotating part. This results in a wide range in which mirror 44 is rotatable in a direction of panning. In the exemplary embodiment, mirror 44 is pivoted 360 degrees in a direction of panning, and is pivoted some tens of degrees or more in a direction of tilting.

Referring back to FIG. 8, laser radar 500 having mirror actuator 1 is described below.

Laser radar 500 includes light-emitting optical system 100, light-receiving optical system 200, position sensitive detector (PSD) 310, and mirror actuator 1 described above.

Light-emitting optical system 100 includes light source 110 and beam shaping lens 120.

Light source 110 emits a laser beam having a wavelength of about 880 nm to about 940 nm. Beam shaping lens 120 causes an emitted laser beam to converge so that the emitted laser beam has a predetermined shape at a target area. Light source 110 and beam shaping lens 120 are disposed next to each other in the Y-axis direction. An emission optical axis of light source 110 coincides with an optical axis of beam shaping lens 120. Light source 110 is disposed such that the emission optical axis passes through a center of pivot of mirror 44 and is parallel to rotating shaft 12 (see FIG. 2A).

As described above, mirror actuator 1 includes mirror 44 on which both a laser beam that has passed through beam shaping lens 120 and reflected light from a target area are incident, and includes a mechanism for causing mirror 44 to pivot about a shaft and about a different shaft. Mirror 44 is pivoted so that a laser beam is scanned over a target area. A laser beam is scanned over the target area, along scan lines parallel to an X-Z plane. Motor 11 is driven to cause mirror 44 to pivot in a direction of panning so that a laser beam is scanned along the scan lines. Additionally, motor 51 is driven to cause mirror 44 to pivot in a direction of tilting so that a laser beam is scanned along a different scan line.

Light-receiving optical system 200 includes bent mirrors 210, 220, light-receiving lens 230, and light detector 240.

Bent mirrors 210, 220 reflect light which has been reflected from a target area and reflected by mirror 44, in a direction toward light detector 240. Each of bent mirrors 210, 220 has a substantially rectangular parallelepiped shape. Bent mirrors 210, 220 are disposed next to each other in the Z-axis direction, with a predetermined space provided between bent mirrors 210, 220. Bent mirrors 210, 220 are disposed such that tilt angles of bent mirrors 210, 220 equal a tilt angle of mirror 44 in a neutral position.

The term "neutral position" refers to a position where mirror 44 tilts toward a direction which is 45 degrees from an axis perpendicular to the X-axis and which is in-plane with a Y-X plane.

The space between bent mirrors 210, 220 is wide enough to allow a laser beam that has been emitted by light source 110 and been converged by beam shaping lens 120 to pass through the space.

Light-receiving lens 230 concentrates light reflected from a target area. Light detector 240 is an avalanche photodiode (APD) or a PIN photodiode. Light detector 240 outputs, to a circuit board, an electric signal of magnitude based on an amount of light received from light-receiving lens 230.

PSD 310 receives light reflected by mirror 44 and outputs, to the circuit board, a position determination signal corresponding to a position of the reflected light on PSD 310.

A laser beam emitted by light source 110 passes through beam shaping lens 120 and then passes through the space between bent mirrors 210, 220. After passing through the space between bent mirrors 210, 220, the laser beam enters mirror 44 of mirror actuator 1. The laser beam incident on mirror 44 is reflected by mirror 44 toward a target area.

Reflected light from the target area travels back along an optical path toward the target area and enters mirror 44. The reflected light incident on mirror 44 is reflected by mirror 44 and enters bent mirrors 210, 220. The space between bent mirrors 210, 220 is significantly narrower than a mirror surface of mirror 44, allowing much of the reflected light from the target area to be incident on bent mirrors 210, 220. The reflected light incident on bent mirrors 210, 220 is reflected by bent mirrors 210, 220 and travels along a direction toward light-receiving lens 230 (i.e., the positive X-axis direction).

The behavior of the reflected light is not changed by a pivoted position of mirror 44. Specifically, reflected light from a target area always travels back along an optical path that an emitted laser beam takes, travels parallel to the optical path of beam shaping lens 120, and enters light-receiving lens 230, regardless of a pivoted position of mirror 44.

The reflected light incident on light-receiving lens 230 is converged at light detector 240 by light-receiving lens 230. Light detector 240 outputs an electric signal of magnitude based on an amount of light received from light-receiving lens 230. The signal from light detector 240 is used for determining a presence of an object at the target area and a distance to the object.

Figure 11:
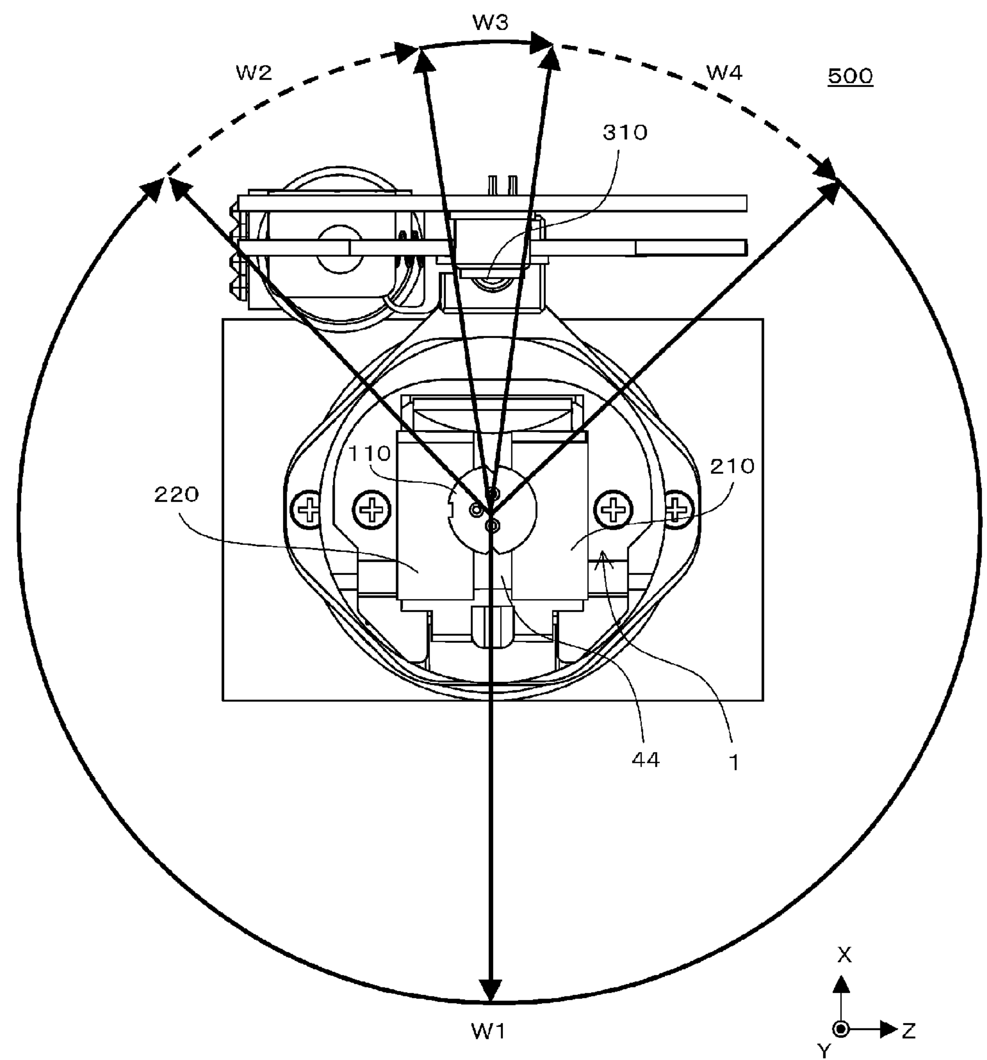
FIG. 11 illustrates a range in which the mirror actuator according to the exemplary embodiment is rotatable in a horizontal direction.

FIG. 11 is a top view of a range in which mirror 44 of laser radar 500 according to the exemplary embodiment is pivoted in a direction of panning.

As illustrated in FIG. 11, in laser radar 500 according to the exemplary embodiment, mirror 44 is pivoted so that a laser beam is scanned over scan range W1, which is wide in the horizontal direction. A laser beam is pulsed over scan range W1 at predetermined intervals. After the scanning of a laser beam is complete over scan range W1, mirror 44 is pivoted to stopping range W2 where light source 110 stops emitting a laser beam. Whether mirror 44 is pivoted to stopping range W2 is determined based on a position determination signal (pulse signal) output from motor 11 (see FIG. 8). When mirror 44 is pivoted to pivoted position determination range W3 from stopping range W2 where light source 110 stops emitting a laser beam, light source 110 restarts emitting (pulsing) a laser beam. Mirror 44 faces PSD 310 within pivoted position determination range W3. Accordingly, when mirror 44 is located within pivoted position determination range W3, a laser beam emitted by light source 110 passes through beam shaping lens 120 (see FIG. 8) and mirror 44, and enters PSD 310. PSD 310 outputs a position determination signal based on a position of the incident laser beam on PSD 310.

In the exemplary embodiment, mirror 44 continues to be pivoted over 360 degrees in one direction of panning when laser radar 500 is operating. The output from PSD 310 is used for seeking an origin point of a rotation of mirror 44 in a direction of panning. Specifically, among laser beams pulsed over pivoted position determination range W3, an emitted laser beam that hits a position on PSD 310 which is closest to a center position of PSD 310 in the Z-axis direction is selected and an emission timing of the selected laser beam is determined. A pivoted position of mirror 44 (i.e., rotated position of motor 11) which corresponds to the emission timing is used as the origin point of a rotation of mirror 44 in a direction panning. A pivoted position of mirror 44 and a rotated position of motor 11 are defined with respect to the origin point. As mirror 44 continues to be pivoted in one direction, an actual pivoted position of mirror 44 deviates from a pivoted position of mirror 44 which is determined based on a position determination signal (pulse signal) from motor 11. The above-described seeking of the origin point allows an actual pivoted position of mirror 44 to be aligned with a pivoted position of mirror 44 which is determined based on a position determination signal (pulse signal).

The output from PSD 310A is also used to correct a position of mirror 44 in a direction of tilting. Specifically, it is determined whether loci of pulsed laser beams on PSD 310 are aligned with loci corresponding to pivoted positions of mirror 44 in a direction of tilting, the pivoted positions taken by mirror 44 when the scans are performed. If the loci are not aligned, a difference between the loci is determined, and an angle of mirror 44 in a direction of tilting is adjusted according to the difference.

In the exemplary embodiment, the seeking of an origin point in a direction of panning and the angle adjustment in a direction of tilting are performed for mirror 44 every time mirror 44 has been pivoted in a direction of panning a predetermined number of times.

When mirror 44 is pivoted to stopping range W4 from pivoted position determination range W3 where light source 110 emits a laser beam, light source 110 stops emitting a laser beam. When mirror 44 is pivoted to scan range W1 from stopping range W4 where light source 110 stops emitting a laser beam, light source 110 restarts emitting (pulsing) a laser beam. At this time, mirror 44 is pivoted in a direction of tilting, to be located at a scan position so that light source 110 performs a scan along a next scan line.

In this way, a laser beam is projected along a plurality of scan lines at a target area. Once a scan along a lower-most scan line is complete, mirror 44 is controlled to be pivoted to be located again at a scan position allowing mirror 44 to perform a scan along an upper-most scan line. Alternatively, once the scan along the lower-most scan line is complete, mirror 44 is controlled to be pivoted to be back at a scan position allowing mirror 44 to perform a scan along a scan line which is one line above the lower-most scan line. As described above, a pivot control for mirror 44 may be altered as appropriate.

As illustrated in FIG. 11, light source 110 is controlled to emit a laser beam only over scan range W1 in which a scanning of a target area is performed. This configuration reduces an amount of electric power consumed by light source 110.

Figure 12:
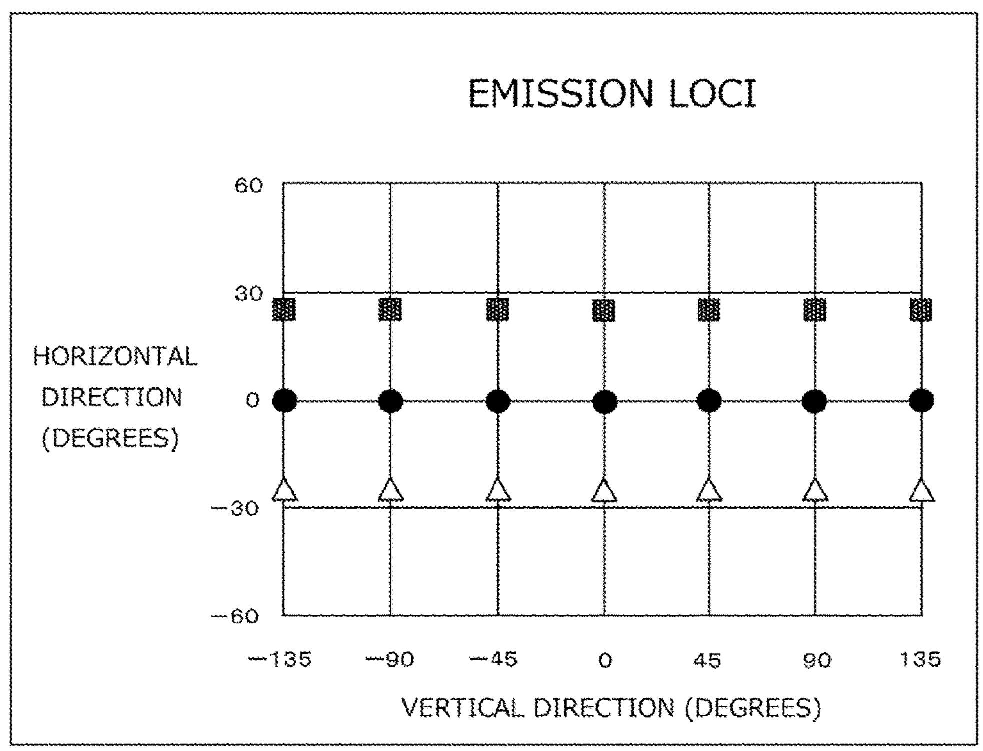
FIG. 12 illustrates emission loci of laser beams, the emission loci obtained using the mirror actuator according to the exemplary embodiment.

FIG. 12 is a graph illustrating emission loci of laser beams according to the exemplary embodiment. A horizontal axis in FIG. 12 represents pivoted angles of mirror 44 in a direction of panning with respect to the neutral position (zero degrees), while a vertical axis in FIG. 12 represents tilt angles of laser beams with respect to a horizontal plane (X-Z plane) when mirror 44 is pivoted by the angles in a direction of panning. A zero degrees in the vertical axis indicates that a direction of a projected laser beam is parallel to the horizontal plane. In the horizontal axis, positive angles of mirror 44 indicate that mirror 44 is pivoted from the neutral position by the angles in a counter-clockwise direction as viewed from above, while negative angles of mirror 44 indicate that mirror 44 is pivoted from the neutral position by the angles in a clockwise direction as viewed from above. A range in which mirror 44 is pivoted in a direction of panning is set to be ±135 degrees with respect to the neutral position.

In FIG. 12, circles indicate that a pivoted angle of mirror 44 in a direction of tilting is set to an angle identical to the pivoted angle of mirror 44 in the neutral position in a direction of tilting; boxes indicate that mirror 44 is tilted approximately 30 degrees from the neutral position in a direction toward the horizontal plane (in a direction of tilting); triangles indicate that mirror 44 is tilted approximately 30 degrees from the neutral position in a direction away from the horizontal plane (in a direction of tilting).

As illustrated in FIG. 12, emission loci in every scan line are in a substantially straight line. This is because, as illustrated in FIG. 8, light source 110 is disposed such that the emission optical axis of light source 110 passes through the center of pivot of mirror 44. When an angle of mirror 44 in the vertical direction is set to remain unchanged, pivoting mirror 44 in the horizontal direction does not cause an emission angle of a laser beam to be displaced in the vertical direction. This is because a laser beam emitted by light source 110 always passes through the center of pivot of mirror 44. Accordingly, without changing a tilt of mirror 44 in a direction of tilting, a laser beam can be scanned substantially horizontally by only pivoting mirror 44 in a direction of panning. Thus, a laser beam can be scanned substantially horizontally by only controlling mirror 44 in a direction of panning, simplifying a control of driving of mirror 44.

Figure 13A:
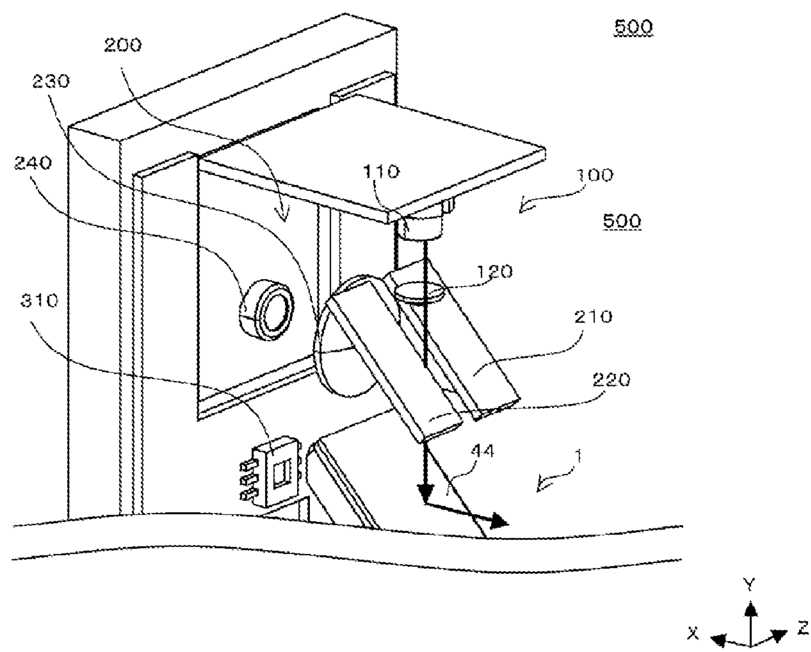
FIG. 13A illustrates an influence that bent mirrors according to the exemplary embodiment cause stray light to have.
Figure 13B:
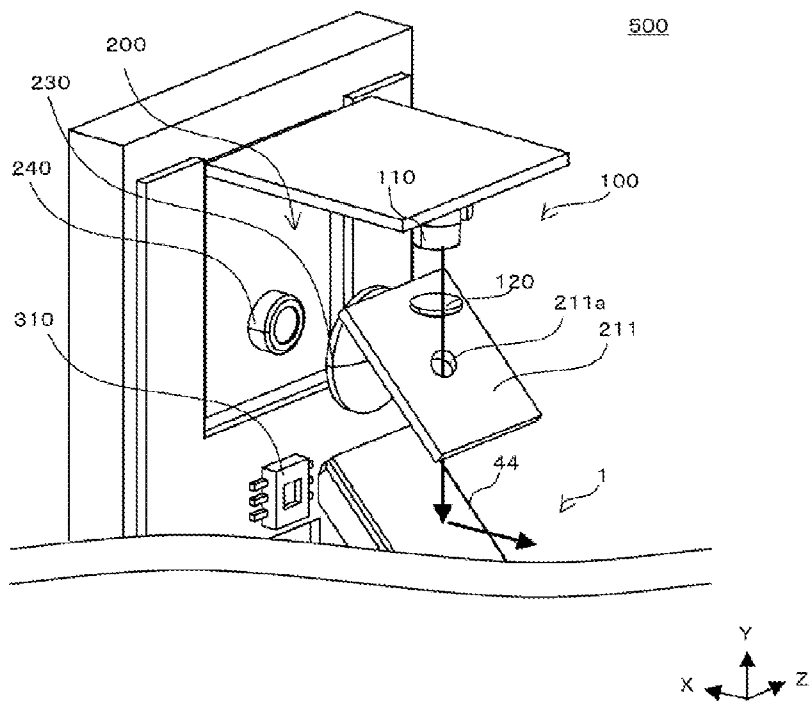
FIG. 13B illustrates an influence that bent mirrors according to a modified example cause stray light to have.

FIG. 13A illustrates an influence that light source 110 and bent mirrors 210, 220 according to the exemplary embodiment cause stray light to have on light detector 240. FIG. 13B illustrates an influence that light source 110 and bent mirror 211 according to a modified example cause stray light to have on light detector 240.

Referring to FIG. 13A, in the exemplary embodiment, bent mirrors 210, 220 are disposed next to each other in the Z-axis direction, with a predetermined space provided between bent mirrors 210, 220. A laser beam that has been emitted by light source 110 is converged by beam shaping lens 120, allowing much of the laser beam to pass through the space between bent mirrors 210, 220. Disposing bent mirrors 210, 220 in this way makes laser radar 500 compact in the Y-axis direction. In this structure, a small part of the laser beam is reflected by side surfaces of bent mirrors 210, 220 and is scattered to become stray light.

As with the modified example illustrated in FIG. 13B, instead of bent mirrors 210, 220, laser radar 500 may include bent mirror 211 including opening 211*a* through which a laser beam can pass. However, in the structure of the modified example, stray light which is a laser beam reflected and scattered by a lower edge of opening 211*a* travels along a direction toward light detector 240 and thus may be incident on light detector 240. Because reflected light from a target area is weak, if the stray light enters light detector 240, light detector 240 may fail to correctly detect the reflected light from the target area. In the exemplary embodiment, a laser beam is reflected by surfaces parallel to the X-Y plane, preventing stray light from traveling in a direction toward light detector 240, unlike the case with the modified example. Accordingly, it is preferred that laser radar 500 includes bent mirrors 210, 220 in the Z-axis direction, with a space between bent mirrors 210, 220, as in the exemplary embodiment so that an influence of stray light on light detector 240 is limited.

With the modified example, a mirror surface of bent mirror 211 for receiving reflected light from a target area is larger than mirror surfaces of bent mirrors 210, 220 according to the exemplary embodiment. Accordingly, for light detector 240 to be able to receive a larger amount of light, it is preferred that laser radar 500 include single bent mirror 211 including opening 211*a*, as illustrated in FIG. 13B.

Figure 14:
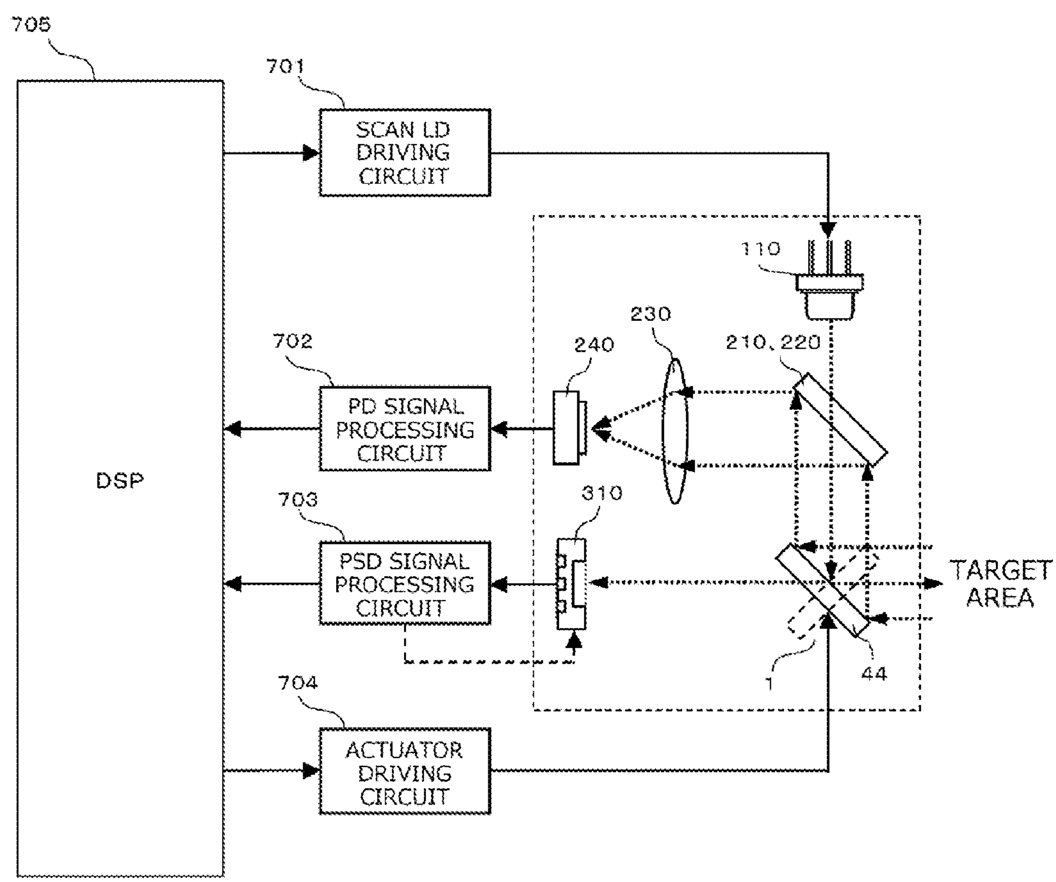
FIG. 14 illustrates a circuit configuration of the laser radar according to the exemplary embodiment.

FIG. 14 illustrates a circuit configuration of laser radar 500.

Scan LD driving circuit 701 provides a driving signal to light source 110 in response to a signal from digital signal processor (DSP) 705. Photodiode (PD) signal processing circuit 702 amplifies and digitizes a voltage signal based on an amount of light received by light detector 240, and provides the resultant voltage signal to DSP 705.

PSD signal processing circuit 703 produces a position determination signal, based on the output signal from PSD 310 and outputs the position determination signal to DSP 705. Actuator driving circuit 704 drives mirror actuator 1, based on a signal from DSP 705. Specifically, mirror actuator 1 is provided with a driving signal for enabling a scanning of a laser beam at a target area along a predetermined track.

DSP 705 determines a position of a laser beam scanned at the target area, based on the position determination signal output from PSD signal processing circuit 703, and performs, for example, a control of driving of mirror actuator 1 or a control of driving of light source 110. Additionally, DSP 705 determines a presence of an object at a position in the target area, the position having been irradiated with a laser beam, based on the voltage signal output from PD signal processing circuit 702, and determines a distance to the object, based on a time between transmission of a laser beam output from light source 110 and reception of reflected light from the target area by light detector 240.

Figure 15:
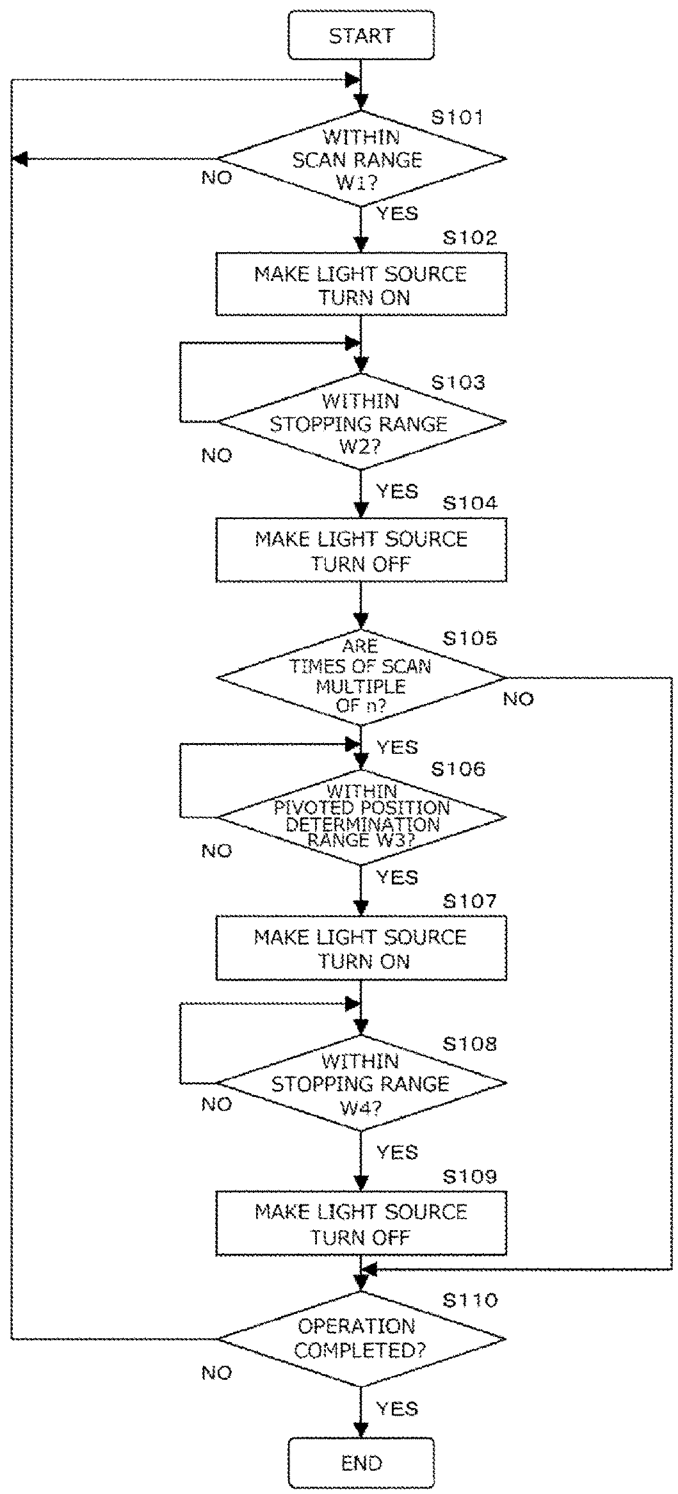
FIG. 15 is a flowchart of a process used to control light emission performed by a light source according to the exemplary embodiment.

FIG. 15 is a flowchart of a process used to control light emission performed by light source 110. The process illustrated in FIG. 15 is executed by DSP 705. As described above, pivoted positions of mirror 44 in a direction of panning and in a direction of tilting are determined based on a position determination signal (pulse signal) from motor 11, 51. A deviation of a position of mirror 44 is corrected using the signal from PSD 310. The flowchart in FIG. 15 illustrates a process used to control light source 110, based on a pivoted angle of mirror 44 in a direction of panning.

Referring to FIG. 15, upon start of a scan over a target area, mirror 44 is located at a scan starting position. Upon a pivoted angle of mirror 44 being within scan range W1 illustrated in FIG. 11 (S101: YES), DSP 705 causes light source 110 to pulse light (S102). DSP 705 determines whether a pivoted angle of mirror 44 is within stopping range W2 illustrated in FIG. 11 (S103). If the pivoted angle of mirror 44 is outside stopping range W2 (S103: NO), DSP 705 continues pulsing light of light source 110. Upon a pivoted angle of mirror 44 being within stopping range W2 illustrated in FIG. 11 (S103: YES), DSP 705 causes light source 110 to stop pulsing light (S104). DSP 705 determines whether a scan has been performed a number of times equal to a multiple of predetermined variable n (S105). Variable n is set as appropriate according to accuracy required of a pivot of mirror 44. For example, where variable n is set to 1, a pivoted position of mirror 44 is corrected every time a scan has been performed. This configuration enables mirror 44 to be pivoted with high accuracy. For example, where variable n is set to 3, a pivoted position of mirror 44 is corrected every time three scans have been performed. This configuration reduces an amount of time required for light source 110 to pulse light to be used for correction of a pivoted position of mirror 44. In the exemplary embodiment, a pivoted position of mirror 44 is corrected every time two or more scans have been performed.

If a scan has been performed a number of times equal to a multiple of n (S105: YES), DSP 705 determines whether a pivoted angle of mirror 44 is within pivoted position determination range W3 illustrated in FIG. 11 (5106). If the pivoted angle of mirror 44 is outside pivoted position determination range W3 (5106: NO), DSP 705 continues to stop pulsing light of light source 110. Upon a pivoted angle of mirror 44 being within pivoted position determination range W3 (5106: YES), DSP 705 causes light source 110 to pulse light (S107). Consequently, a laser beam emitted by light source 110 enters PSD 310. DSP 705 performs the seeking of an origin point in a direction of panning and the correction of an angle of mirror 44 in a direction of tilting, as described above, based on the signal from PSD 310. If a scan has not been performed a number of times equal to a multiple of n (S105: NO), DSP 705 causes the process to proceed to S110 by skipping both a processing of causing light source 110 to pulse light when a pivoted angle of mirror 44 is within pivoted position determination range W3 and a processing of causing light source 110 to stop pulsing light when a pivoted angle of mirror 44 is within stopping range W4.

DSP 705 determines whether a pivoted angle of mirror 44 is within stopping range W4 (S108). If the pivoted angle of mirror 44 is outside stopping range W4 (S108: NO), DSP 705 continues causing light source 110 to pulse light. If the pivoted angle of mirror 44 is within stopping range W4 (S108: YES), DSP 705 causes light source 110 to stop pulsing light (S109). DSP 705 determines whether an operation has completed (S110). If the operation has not completed (S110: NO), DSP 705 causes the process to return to S101, and causes light source 110 to pulse light along a next scan line (S101 to S109). If the operation has completed (S110: YES), DSP 705 ends the process used to control light source 110.

Effects of Exemplary Embodiment

The exemplary embodiment provides for the following effects.

As illustrated in FIG. 8, outer frame 21 and inner frame 31 rotated by motor 11 are not provided with a driving source. Guide 21*b* is moved in the vertical direction along guide shaft 22 by motor 51 disposed to base 500*a*. The vertical movement of guide 21*b* causes inner frame 31, which is integrally connected to outer frame 21, to move in the vertical direction, which in turn causes roller 42 and support shaft 43 to move in the forward and backward direction. Consequently, mirror 44 is pivoted in a direction of tilting. As described above, outer frame 21 and inner frame 31 rotated by motor 11 are not provided with a driving source and thus do not need to be provided with electric power for outer frame 21 and inner frame 31. Thus, a pivot of mirror 44 is not limited by, for example, a signal wire for supplying electric power, resulting in a wide range in which mirror 44 is rotatable. Consequently, a laser beam can be scanned over a wide area.

As illustrated in FIG. 6B, inner frame 31 is slidably supported by rotating shaft 12. Accordingly, rotating shaft 12 for rotating outer frame 21 and inner frame 31 also functions as a sliding shaft. Consequently, a number of components is reduced, making mirror actuator 1 compact in structure.

As illustrated in FIG. 8, PSD 310 is provided at the positive X-axis side of mirror 44. Accordingly, a laser beam emitted by light source 110 enters PSD 310 when mirror 44 faces in the positive X-axis direction. With this configuration, a pivoted position of mirror 44 can be determined. Thus, light source 110 and mirror 44 also serve as an optical system for determining a pivoted position of mirror 44, reducing the number of components.

As illustrated in FIG. 8, light source 110 is disposed such that the emission optical axis of light source 110 is parallel to rotating shaft 12 and passes through the center of mirror 44. This configuration enables emission loci to be in a substantially straight line, as illustrated in FIG. 12. Additionally, disposing light source 110 above mirror 44 prevents a laser beam reflected by mirror 44 from traveling toward light source 110 side. Consequently, mirror 44 can be pivoted 360 degrees, further widening the range in which a laser beam is scanned.

As illustrated in FIGS. 13A and 13B, bent mirrors 210, 220 or bent mirror 211 is disposed between light source 110 and mirror 44. This structure makes laser radar 500 compact in the Y-axis direction.

As illustrated in FIG. 13A, bent mirrors 210, 220 are disposed next to each other in the Z-axis direction, with a space provided between bent mirrors 210, 220. This structure limits an influence of stray light on light detector 240.

As illustrated in FIG. 11, light source 110 is controlled to emit a laser beam only over scan range W1 in which a scanning of a target area is performed. This configuration reduces an amount of electric power consumed by light source 110.

As illustrated in FIG. 15, light emission by light source 110 for determining a pivoted position of mirror 44 is performed every time scans are performed. This configuration further reduces the amount of electric power consumed by light source 110.

The exemplary embodiment of the present disclosure has been described. It should be noted that the disclosure is not limited to the exemplary embodiment, and that modifications other than the above modification may be made to the exemplary embodiment of the present disclosure.

For example, in the exemplary embodiment, rotating shaft 12 is also used as a sliding shaft for sliding inner frame 31 as illustrated in FIG. 6B, but a sliding shaft may be provided as a separate component. However, it is preferred that rotating shaft 12 also function as a rotating shaft as in the exemplary embodiment because the number of components is reduced in that way.

In the exemplary embodiment, a presence of bent mirrors 210, 220 requires light-receiving optical system 200 to be provided between light source 110 and mirror 44, as illustrated in FIG. 8. However, light-receiving optical system 200 may be provided at the positive Y-axis side of light source 110. In that case, although bent mirrors 210, 220 are eliminated, a mirror surface of mirror 44 needs to be larger than the mirror surface of mirror 44 in the exemplary embodiment so as to allow mirror 44 to receive a larger amount of reflected light. Additionally, optical components are in line along the Y-axis direction, increasing an entire dimension of laser radar 500. Accordingly, it is preferred that bent mirrors 210, 220 be disposed in the way described in the exemplary embodiment so as to make laser radar 500 smaller.

In the exemplary embodiment, light-receiving optical system 200 is constituted by bent mirrors 210, 220, light-receiving lens 230, and light detector 240, but light-receiving optical system 200 may also include a light-shielding member or a band pass filter that passes only light which is emitted by light source 110 and has a wavelength of a laser beam. Additionally, for the optical path toward PSD 310, the light-shielding member or the filter may be used as appropriate.

Various modifications may be made to the exemplary embodiment of the present disclosure without departing from the spirit as set forth in the claims.

What is claimed is:

1. A mirror driving device comprising:

a rotating shaft;

a first driving source which rotates the rotating shaft;

a mirror holder which is supported on the rotating shaft by a support shaft extending perpendicular to the rotating shaft, the mirror holder being rotatable about the support shaft;

a mirror mounted on the mirror holder;

a holding part provided at an edge of the mirror holder;

a rotating body on which the mirror holder is placed at a position located away from the support shaft;

a guide which is disposed at the holding part and which guides the holding part so as to be capable of changing a distance between the holding part and the rotating shaft;

a moving mechanism which moves the rotating body in a direction parallel to the rotating shaft in a state where the rotating body is rotatable with the rotating shaft; and a second driving source which moves the rotating body via the moving mechanism.

2. The mirror driving device according to claim 1, wherein the moving mechanism includes a moving body to which the rotating body is rotatably coupled via a bearing and includes a gear which guides the moving body in the direction parallel to the rotating shaft.

3. The mirror driving device according to claim 1, wherein the rotating body is slidably supported by the rotating shaft.

4. A beam irradiation device comprising:

the mirror driving device according to claim 1;

a light source which emits a laser beam; and a light-emitting optical system which causes the laser beam emitted by the light source to enter the mirror.

5. The beam irradiation device according to claim 4, comprising a position sensitive detector which receives the laser beam reflected by the mirror when the mirror is located at a predetermined pivoted position, the position sensitive detector detecting a receiving position of the laser beam.

6. The beam irradiation device according to claim 5, comprising a light source controlling unit which controls turning on and turning off of the light source, wherein the light source controlling unit causes the light source to turn on when the mirror is located at a pivoted position allowing the mirror to reflect the laser beam in a direction toward a target area and when the mirror is located at a pivoted position allowing the mirror to reflect the laser beam in a direction toward the position sensitive detector.

7. The beam irradiation device according to claim 4, wherein the light source and the light-emitting optical system are configured such that an optical axis of the laser beam is parallel to the rotating shaft and passes through a center of pivot of the mirror.

8. A laser radar comprising:

the beam irradiation device according to claim 7; and a light-receiving optical system which guides, to a light detector, the laser beam that has been reflected from a target area and has entered the mirror, wherein the light-receiving optical system includes a space through which a laser beam that is emitted by the light source and travels toward the mirror passes, and includes a reflecting portion having a reflecting surface for reflecting the laser beam that has been reflected from the target area and has entered the mirror.

9. The laser radar according to claim 8, wherein the reflecting portion includes a first mirror and a second mirror disposed next to the first mirror in a direction perpendicular to the rotating shaft, with the space provided between the first mirror and the second mirror.

* * * * *